(12) United States Patent
Yamamoto et al.

(10) Patent No.: US 10,432,898 B2
(45) Date of Patent: Oct. 1, 2019

(54) PROJECTOR HAVING LIGHT SOURCE INCLUDING LASER DIODES

(71) Applicant: CASIO COMPUTER CO., LTD., Tokyo (JP)

(72) Inventors: Kyo Yamamoto, Higashimurayama (JP); Masahiro Ogawa, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 649 days.

(21) Appl. No.: 14/575,217

(22) Filed: Dec. 18, 2014

(65) Prior Publication Data

US 2015/0181179 A1     Jun. 25, 2015

(30) Foreign Application Priority Data

Dec. 20, 2013   (JP) .................................. 2013-264119
Mar. 17, 2014   (JP) .................................. 2014-053381

(51) Int. Cl.
| | |
|---|---|
| *H04N 9/31* | (2006.01) |
| *G03B 21/20* | (2006.01) |
| *G03B 33/08* | (2006.01) |
| *G02B 19/00* | (2006.01) |

(52) U.S. Cl.
CPC ........... *H04N 9/31* (2013.01); *G02B 19/0028* (2013.01); *G02B 19/0057* (2013.01); *G03B 21/204* (2013.01); *G03B 21/208* (2013.01); *G03B 21/2013* (2013.01); *G03B 33/08* (2013.01)

(58) Field of Classification Search
CPC .... H04N 9/31; G02B 19/0057; G02B 21/204; G03B 21/2013; G03B 21/208; G03B 33/08

USPC .......................................................... 353/94
See application file for complete search history.

(56) References Cited

U.S. PATENT DOCUMENTS

| | | | |
|---|---|---|---|
| 2005/0140933 A1 | 6/2005 | Cannon et al. | |
| 2006/0164600 A1* | 7/2006 | Morejon ............ | G02B 27/1033 353/31 |
| 2006/0238720 A1* | 10/2006 | Lee .................... | G02B 27/0994 353/38 |
| 2007/0092189 A1* | 4/2007 | Morejon ............ | G02B 26/0833 385/120 |

(Continued)

FOREIGN PATENT DOCUMENTS

| | | | | |
|---|---|---|---|---|
| FR | 1321787 A | 3/1963 | | |
| GB | 2496851 A | * 5/2013 | ......... | H01L 25/0753 |

(Continued)

OTHER PUBLICATIONS

Machine Translation of JP 2011-133782.*

(Continued)

*Primary Examiner* — Steven Whitesell Gordon
*Assistant Examiner* — Jerry L Brooks
(74) *Attorney, Agent, or Firm* — Scully Scott Murphy & Presser

(57) ABSTRACT

There is provided a projector including a plurality of laser diodes and a rectangular display device on to which light emitted from the plurality of laser diodes is shone, wherein the display device is disposed so that a direction of a major axis of an elliptic section of light emitted from each of the plurality of laser diodes becomes substantially parallel to a direction of longer sides of the display device.

15 Claims, 11 Drawing Sheets

(56) References Cited

U.S. PATENT DOCUMENTS

| | | |
|---|---|---|
| 2009/0185144 A1 | 7/2009 | Grasser |
| 2011/0128506 A1 | 6/2011 | Takagi |
| 2011/0194578 A1 | 8/2011 | Hirose et al. |
| 2012/0092624 A1 | 4/2012 | Oiwa et al. |
| 2013/0038847 A1 | 2/2013 | Katou |
| 2013/0057834 A1* | 3/2013 | Yoshida ............... B23P 11/00 353/38 |
| 2016/0312975 A1 | 10/2016 | Miura |

FOREIGN PATENT DOCUMENTS

| | | | | |
|---|---|---|---|---|
| JP | H10-186519 A | | 7/1998 | |
| JP | 2008-288616 A | | 11/2008 | |
| JP | 2010-251796 A | | 11/2010 | |
| JP | 2011-114182 A | | 6/2011 | |
| JP | 2011-133782 | * | 7/2011 | ............. G03B 21/14 |
| JP | 2011-133782 A | * | 7/2011 | |
| JP | 2011-165760 A | | 8/2011 | |
| JP | 2012-123948 A | | 6/2012 | |
| JP | 2012-203392 A | | 10/2012 | |
| JP | 2013-011651 A | | 1/2013 | |
| JP | 2013-045037 A | | 3/2013 | |
| JP | 2013-080055 A | | 5/2013 | |
| JP | 2013-195758 A | | 9/2013 | |
| JP | 2015-121597 A | | 7/2015 | |
| WO | 2013/047542 A1 | | 4/2013 | |

OTHER PUBLICATIONS

Specification for G 2496851 (A).*
Extended European Search Report dated Dec. 18, 2015 from related European Application No. 14 19 9175.2.
Notification of Reasons for Refusal dated Nov. 2, 2017 received in Japanese Patent Application No. JP 2013-264119 together with an English language translation.
Notification of Reasons for Refusal dated Feb. 8, 2018 received in Japanese Patent Application No. JP 2014-053381 together with an English language translation.

* cited by examiner

PROJECTOR HAVING LIGHT SOURCE INCLUDING LASER DIODES

CROSS-REFERENCE TO RELATED APPLICATION

This patent application is based upon and claims the benefit of priority under 35 USC 119 from the prior Japanese Patent Application No. 2013-264119 filed on Dec. 20, 2013, and the prior Japanese Patent Application No. 2014-53381 filed on Mar. 17, 2014, the entire disclosures of which, including their descriptions, claims, drawings and abstracts, are incorporated herein by reference.

BACKGROUND OF THE INVENTION

Field of the Invention

The present invention relates to a projector having a light source that includes laser diodes.

Description of the Related Art

In these days, data projectors are used on many occasions as an image projection system which projects an image of a screen of a personal computer or a video image, as well as images based on image data which is stored on a memory card on to a screen. A display device called a DMD (Digital Micromirror Device) is used in such a projector. The DMD has lots of microscopic mirror surfaces (micromirrors) that are arranged on a flat surface thereof, and when light emitted from a light source is shone on to the micromirrors, the DMD emits light representing a projected image or projected image light. In projectors that utilize such DMDs, projectors are now under development which have a light source unit including laser diodes (LDs) as a high-intensity light source so as to obtain clear projection light even in a bright location.

As described in JP-2013-80055A (Japanese Unexamined Patent Publication), the applicant of this patent application proposes and carries out a projector utilizing a blue laser oscillator that emits blue light as a light source in which light in the blue wavelength range that is emitted by the blue laser oscillator is shone on to an image forming surface of a DMD that is a display device by way of various optical components together with light in the other wavelength ranges.

In the projector disclosed in JP-2013-80055A, in total, 24 blue laser oscillators that are blue laser diodes are arranged into a matrix of tree rows and eight columns; each row including eight blue laser diodes in a front-to-rear direction of the projector and each column including three blue laser diodes in a top-to-bottom direction of the projector. This blue laser oscillator emits light from a right-hand side to a left-hand side in an interior of the projector in such a way that the axis of a laser beam becomes parallel to a back panel of the projector. Then, the direction of the axis of the laser beam is changed by 90 degrees by a reflecting mirror so as to be emitted towards a front panel.

This reflecting mirror has a vertically elongated rectangular shape so that laser beams from the three laser oscillators that are arranged vertically can be reflected by the single reflecting mirror. Then, eight vertically elongated rectangular reflecting mirrors that are so formed are used for the matrix of 24 blue laser oscillators, and the eight reflecting mirrors are disposed in a steps-like fashion in a front-to-rear direction. When light from each laser oscillator that spreads twice or more in the front-to-rear direction than in a top-to-bottom direction is reflected towards the front panel, 24 laser beams are collected densely with each beam being slightly wider in a left-to-right direction than in the top-to-bottom direction by disposing the reflecting mirrors in that way.

Here, in a general laser diode, a radiation angle relative to a junction surface of the diode differs between a vertical direction and a horizontal direction. It is known that because of this characteristic, a section of light emitted from the laser diode takes an elliptic shape. A pencil of light from the light source that is formed as a collection of light having the elliptic section that is emitted from laser diodes reaches to be shone on to a DMD by way of lenses, a luminescent material on a luminescent wheel, mirrors, a light tunnel and the like. Even though the pencil of light travels byway of those optical components, the shape of the elliptic section and the orientation of the rotational direction of the axis of the light emitted from each laser diode remain as they are.

Additionally, in a light source disclosed in JP-2012-80055A, light emitted from the blue laser diode is reflected by the reflecting mirror that is disposed in such a way that longer sides of the rectangle become vertical. Then, the laser diodes are attached in such a way that laser beams emitted from the laser diodes are formed into a vertically elongated elliptic shape so as not to increase the width of the vertically elongated rectangular reflecting mirror or the length of shorter sides thereof. Because of this, the pencil of light that is shone on to the DMD when it arrives at the DMD from the light source is formed as a collection of light from the individual laser diodes in which the elliptic sections are aligned while being oriented in such a way that their major axes become vertical.

On the other hand, in the image forming surface of the DMD that is the display device, a large number of micromirrors that correspond to the number of pixels of an image are disposed into a horizontally elongated rectangle. The image forming surface on which the micromirrors are so disposed is disposed in such a way that the longer sides lie horizontal relative to the projector so that the projected image light forms a horizontally elongated rectangular shape that matches the aspect ratio of a projected image.

SUMMARY OF THE INVENTION

According to an aspect of the invention, there is provided a projector including a plurality of laser diodes and a rectangular display device on to which light emitted from the plurality of laser diodes is shone, wherein the display device is disposed in such a way that the direction of a major axis of an elliptic section of light emitted from each of the plurality of laser diodes becomes parallel to the direction of longer sides of the display device.

BRIEF DESCRIPTION OF THE SEVERAL VIEWS OF THE DRAWINGS

FIG. 12A is a schematic plan view showing an image forming surface of the display device. FIG. 12B is a schematic enlarged plan view showing a part of the imaging forming surface of the display device.

DETAILED DESCRIPTION OF THE PREFERRED EMBODIMENTS

Hereinafter, a best mode for carrying out the invention will be described by the use of the accompanying drawings. Although the following embodiments have various preferred technical limitations for carrying out the invention, those technical limitations are not intended to limit the scope of the invention to the embodiments and illustrated examples.

First Embodiment

Figure 1:
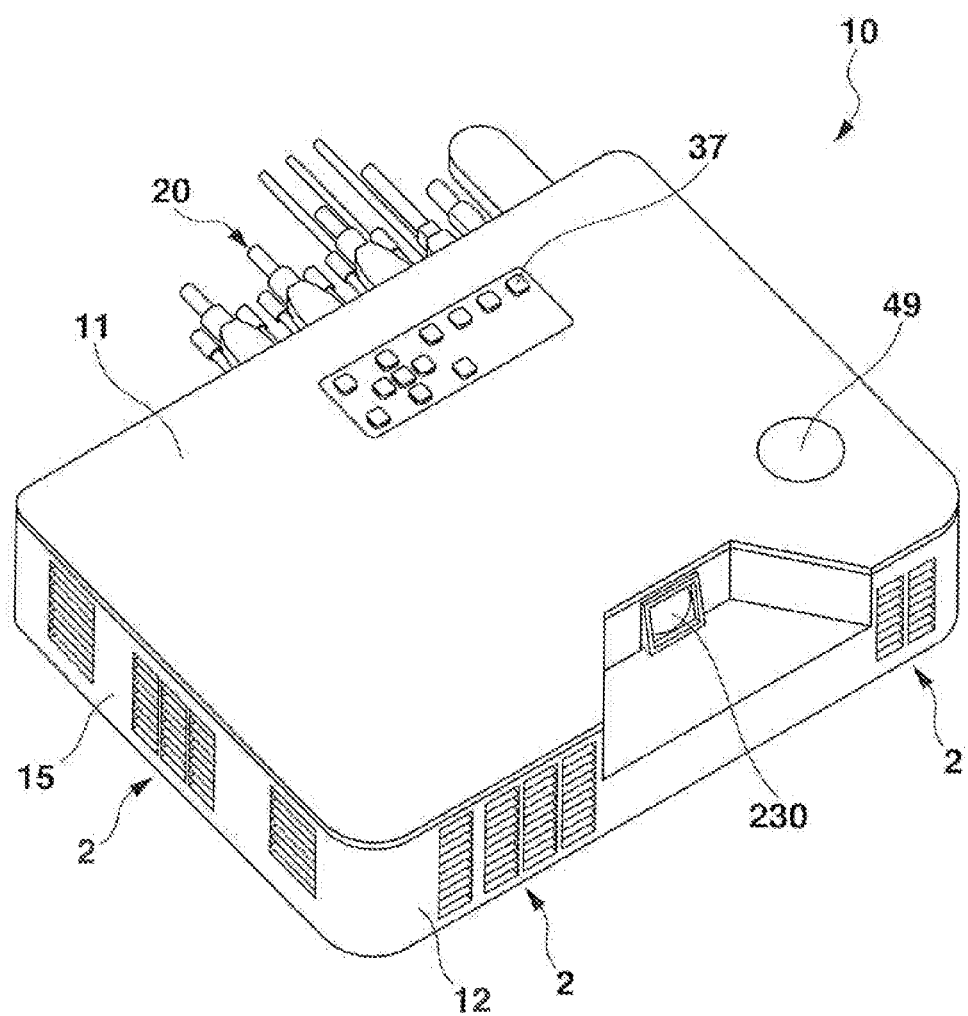
FIG. 1 is an external perspective view showing a projector according to a first embodiment of the invention.

Hereinafter, a first embodiment of the invention will be described in detail based on the drawings. FIG. 1 is an external perspective view of a projector 10. In this embodiment, when left and right are referred to in relation to the projector 10, they denote, respectively, left and right with respect to a projecting direction, and when front and rear are referred to in relation to the projector 10, they denote, respectively, front and rear with respect to a direction towards a screen from the projector 10 and a traveling direction of a pencil of light emitted from the projector 10.

The projector 10 has a substantially rectangular parallelepiped casing that is made up of an upper panel 11, a front panel 12, and a right side panel 15, as well as a back panel, a left side panel and a bottom panel that are not shown in FIG. 1. A trapezoidal recess portion, when seen from the top, is formed in a position lying slightly further leftwards than a middle of the front panel 12 with an upper base oriented to the rear. A projection lens 230 is provide in a rear wall surface of the recess portion. An image is projected in the direction of a screen by this projection lens 230.

A number of inlet and outlet ports 2, which are rectangular holes, are provided in the front panel 12 and the right side panel 15 for cooling various components that are disposed in an interior of the housing. Although not shown, inlet and outlet ports are also provided in the back panel and the left panel. Additionally, a speaker window 49 and a keys/indicators unit 37 are provided on the upper panel 11. Disposed on this keys/indicators unit 37 are keys and indicators which include a power supply switch key, a power indicator which informs whether the power supply is on or off, a projection switch key which switches on or off the projection by the projector 1, an overheat indicator which informs of an overheat condition when a light source unit, the display element, a control circuit or the like overheats.

An input/output connector unit where USB terminals, a D-SUB terminal where image signals are inputted, an S terminal, an RCA terminal and the like are provided and various types of terminals 20 including a power supply adaptor plug are provided on the back panel. Although not shown, the projector 10 includes an Ir reception unit that receives a control signal from a remote controller.

Figure 2:
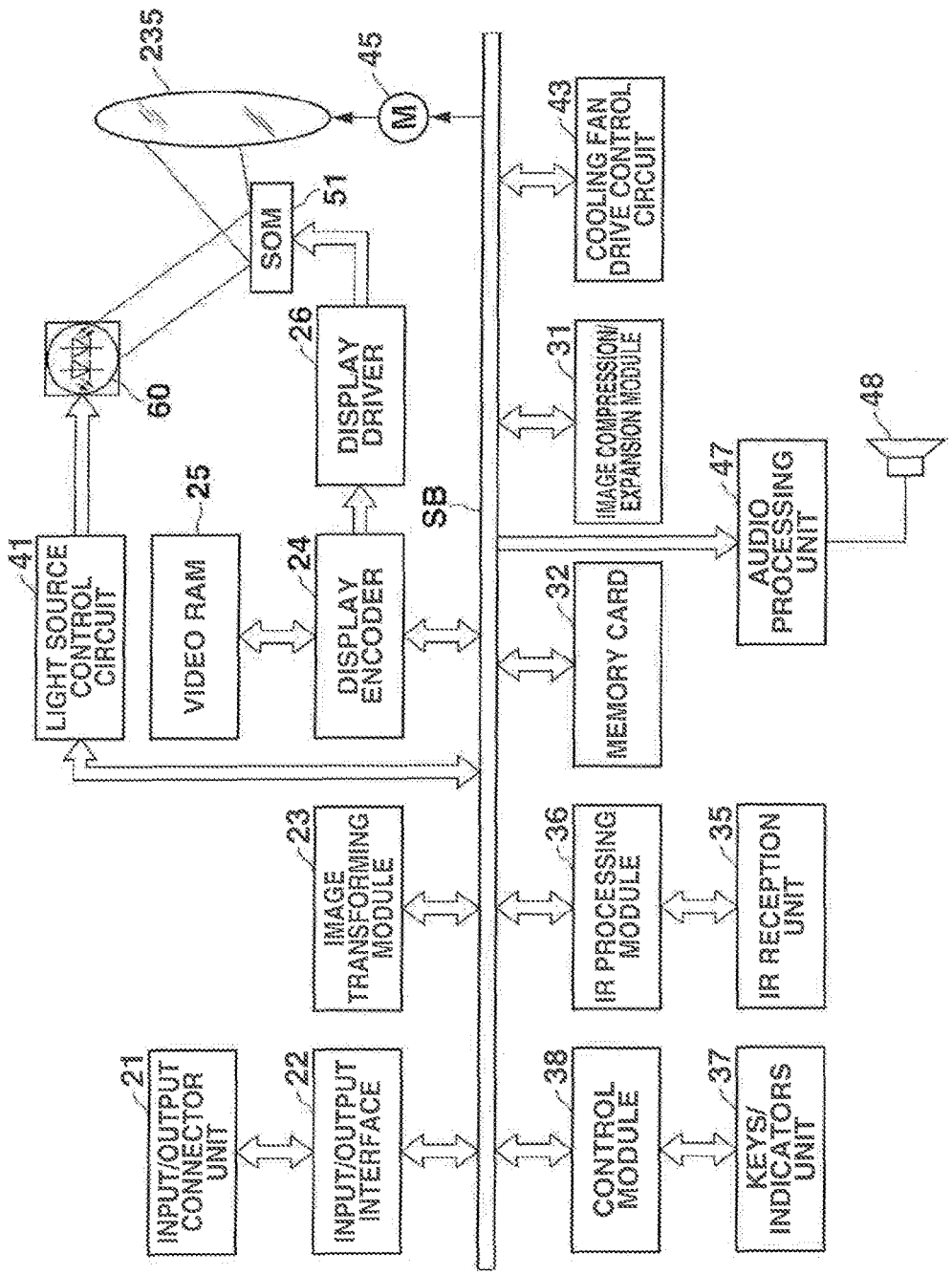
FIG. 2 is a functional block diagram of the projector according to the first embodiment of the invention.

Next, a control unit of the projector 10 will be described by the use of a functional block diagram shown in FIG. 2. The control unit includes a control module 38, an input/output interface 22, an image transforming module 23, a display encoder 24, a display driver 26 and the like.

This control module 38 governs the control of respective operations of circuitries within the projector 10 and is made up of a CPU, a ROM which stores in a fixed fashion operation programs of various types of settings, a RAM which is used as a working memory, and the like.

Image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to the image signal outputted from the display encoder 24 Then, in this projector 10, a pencil of light that is emitted from a light source unit 60 is shone onto the display device 51 via a light source side optical system, which will be described later, to thereby form an optical image by using reflected light that is reflected by the display element 51. The image so formed is then projected on to a screen, not shown, for display thereon via a projection side optical system. A movable lens group 235 of the projection side optical system is driven by a lens motor 45 for zooming or focusing.

An image compression/expansion module 31 performs a recording operation in which a brightness signal and a color difference signal of an image signal is compressed by using ADCT and the Huffman method to be sequentially written on a memory card 32 that is regarded as a detachable memory medium.

In addition, when in a reproducing mode, the image compression/expansion module 31 reads out image data recorded on the memory card 32 and expands individual image data that make up a series of dynamic images frame by frame. Then, the image data is outputted to the display encoder 24 via the image transforming module 23 so as to enable the display of dynamic images and the like based on the image data stored on the memory card 32.

Operation signals generated at the keys/indicators unit 37 that includes the keys and the indicators that are provided on the upper panel 11 of the casing are sent out directly to the control module 38. Key operation signals from the remote controller are received by the Ir reception unit 35, and cord signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in the projection mode and the reproducing mode, the audio processing unit 47 converts audio data into analog signals and drives a speaker 48 to output loudly sound or voice based on the audio data.

The control module 38 controls a light source control circuit 41 that is configured as a light source control unit. This light source control circuit 41 controls separately and individually the emission of light from a red light source device, a blue light source device, and an excitation light shining device that is an excitation light source for generating light in the green wavelength range in the light source unit 60 so that lights in the predetermined wavelength ranges that are required when an image is generated are emitted from the light source unit 60.

Further, the control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate, even after the power supply to the projector 10 itself is turned off, through a timer or the power supply to the projector 10 itself is turned off depending upon the results of the temperature detections by the temperature sensors.

Figure 3:
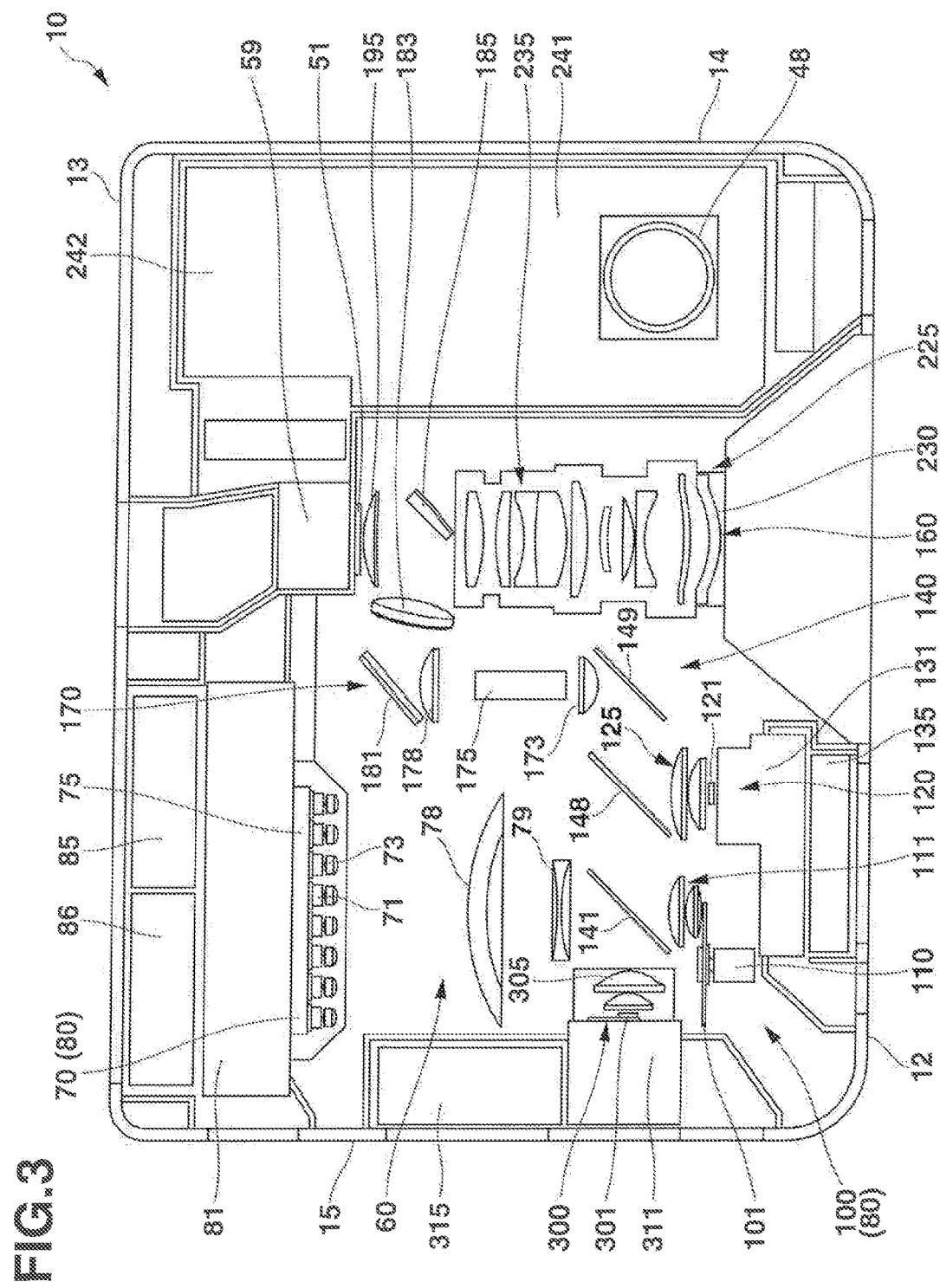
FIG. 3 is a schematic plan view showing an internal construction of the projector according to the first embodiment of the invention.

Next, an internal construction of the projector 10 will be described. FIG. 3 is a schematic plan view showing the internal construction of the projector 10. The projector 10 has the light source unit 60, a light source side optical system 170 that guides light from the light source unit 60 to the display device 51, and a projection side optical system 150 that projects an image emitted from the display device 51 on to a screen, not shown.

The projector 10 has a power supply circuit block 241 near the left side panel 14. A power supply circuit board 242 is disposed in the power supply circuit block 241. A power supply circuit is mounted in the power supply circuit board 242, and this power supply circuit generates power supply voltages for power supplies to turn on the individual light sources, a main power supply for a DMD and various ICs, a driving power supply to drive a mechanism system such as a motor, and the like.

Various signals from the keys/indicators unit 37 that includes the main keys and the indicators that are provided on the upper panel 11 are connected to a main circuit board, not shown, and a control circuit is mounted on this main circuit board. The control circuit governs the control of the whole of the projector 10 including various ICs such as the CPU disposed near the power supply circuit block 241.

In the projector 10, the projection side optical system 150 is provided in a position that lies slightly further leftwards than a central position of the casing of the projector 10 in relation to the left-to-right direction and at a side where the power supply circuit block 241 faces the right side panel 15.

The projector 10 has the light source unit 60 which positions at a side where the projection side optical system 150 faces the right side panel 15.

The light source unit 60 is formed by a green light source device 80 that emits light in the green wavelength range, a red light source device 120 that emits light in the red wavelength range, a blue light source device 300 that emits light in the blue wavelength range, and a light guiding system 140. The green light source device 80 includes an excitation light shining device 70 that is disposed near the back panel 13 and a luminescent wheel device 100 that is disposed on an axis of a pencil of light that is emitted from the excitation light shining device 70 and near the front panel 12.

The red light source device 120 is disposed near the front panel 12 so as to be parallel to a pencil of light that is emitted from the luminescent wheel device 100. The blue light source device 300 is disposed between the excitation light shining device 70 and the luminescent wheel device 100. The light guiding optical system 140 changes the directions of axes of light in the red wavelength range, light in the green wavelength range and light in the blue wavelength range so that the axes of the red, blue and green lights are oriented in the same direction to converge on an incident port of a light tunnel 175 that is a light guiding member.

The excitation light shining device 70 of the green light source device 80 includes a plurality of excitation light sources 71 that are disposed so that an axis of light emitted from each of the excitation light sources 71 is at right angles to the back panel 13, collimator lenses 73 that are disposed at the front of each the excitation light sources 71, collective lenses 78, 79 that collect light emitted from each the excitation light sources 71, and a heat sink 81 that is disposed between the excitation light sources 71 and the back panel 13. Additionally, cooling fans 85, 86 are disposed on a side of the heat sink 81 that faces the back panel 13.

The excitation light sources 71 are blue laser diodes that are semiconductor light emitting elements. The excitation light sources 71 are held by a holder 75 having a flat plate-like shape. The collimator lens 73 converts light emitted from the excitation light source 71 into parallel light so as to enhance the directionality of the emitted light. The plurality of collimator lenses 73 are disposed so that their lens centers are slightly offset from axes of pencils of light that are emitted from the laser diodes or the excitation light sources 71, whereby the pencils of light are emitted to the collective lens 78 while spaces defined between the pencils of light are being reduced. The laser beams are then superposed one on another by the collective lens 78 and the collective lens 79, and further a group of collective lenses 111 to thereby be shone on to a luminescent wheel 101 of the luminescent wheel device 100.

The luminescent wheel device 100 of the green light source device 80 includes the luminescent wheel 101, a wheel motor 110 that drives to rotate the luminescent wheel 101 and the group of collective lenses 111. The luminescent wheel 101 is disposed so as to be parallel to the front panel 12, that is, so as to be at right angles to an axis of light emitted from the excitation light shining device 70. The group of collective lenses 111 collects pencils of light emitted from a side of the luminescent wheel 101 that faces the back plate 13.

The luminescent wheel 101 is a metallic base having a circular disc shape. In this luminescent wheel 101, a circular luminescent light emitting area that emits luminescent light is formed as a recess portion. The luminescent wheel 101 functions as a luminescent plate that emits luminescent light when receiving excitation light. Additionally, a surface of the luminescent wheel 101 that includes the luminescent light emitting area and that faces the excitation light sources 71 is mirror finished through silver deposition or the like to thereby be formed into a reflecting surface that reflects light. A layer of green luminescent material is laid out on this reflecting surface.

Then, light emitted from the excitation light shining device 70 to be shone on to the green luminescent material layer of the luminescent wheel 101 excites the green luminescent material in the green luminescent material layer. Pencils of light emitted in every direction from the luminescent material layer are emitted directly towards the excitation light sources or are reflected on the reflecting surface of the luminescent wheel 101 to thereafter be emitted towards the excitation light shining device 70.

In addition, excitation light that is shone on to the metallic base without being absorbed by the luminescent material in the luminescent material layer is reflected on the reflecting surface to thereafter be incident on the luminescent material layer again, whereby the excitation material is exited. Thus, by making the surface of the recess portion of the luminescent wheel 101 into the reflecting surface, the utilization efficiency of excitation light emitted from the excitation light sources 71 can be enhanced, thereby making it possible to obtain brighter luminescent material.

In the excitation light that is reflected on the reflecting surface of the luminescent wheel 101 towards the luminescent material layer, excitation light that is emitted towards the excitation light shining device 70 without being absorbed by the luminescent material passes through a first dichroic mirror 141, while the luminescent light is reflected by the first dichroic mirror 141. Therefore, there no such situation that excitation light is emitted to the outside of the light source unit 60

The blue light source device 300 includes a blue light source 301 and a group of collective lenses 305 that collects light emitted from the blue light source 301. The blue light source 301 is disposed so as to be at right angles to the axis of light emitted from the luminescent wheel device 100. This blue light source device 300 is disposed so that an optical axis thereof intersects with light emitted from the red light source device 120, which will be described later, at right angles. The blue light source 301 is a blue light emitting diode as a semiconductor light emitting element that emits light in the blue wavelength range.

Further, the blue light source device 300 includes a heat sink that is disposed on a side of the blue light source 301 that faces the right side panel 15. A cooling fan 315 that cools the heat sink 311 is disposed between the heat sink 311 and the back panel 13.

The red light source device 120 includes a red light source 121 and a group of collective lenses 125 that collects light emitted from the red light source 121. The red light source 121 is disposed so that an optical axis thereof becomes parallel to the excitation light sources 71. The red light source device 120 is disposed so that an optical axis thereof becomes parallel to light emitted from the excitation light shining device 70 and light in the green wavelength range emitted from the luminescent wheel 101.

The red light source 121 is a red light emitting diode as a semiconductor light emitting element that emits light in the red wavelength range. The red light source 120 includes further a heat sink 131 that is disposed on a side of the red light source 121 that faces the front panel 12. A cooling fan 135 that cools the heat sink 131 is disposed at the front panel 12.

The light guiding optical system 140 includes the first dichroic mirror 141, a second dichroic mirror 148, and a reflecting mirror 149. The first dichroic mirror 141 is disposed in a position where axes of light in the blue wavelength range emitted from the excitation light shining device 70 and light in the green wavelength range emitted from the luminescent wheel 101 intersect with light in the blue wavelength range emitted from the blue light source device 300. The first dichroic mirror 141 transmits light in the blue wavelength range and reflects light in the green wavelength range in such a way that the direction of the axis of the light in the green wavelength range is changed by 90 degrees so as to cause the axis of the light in the green wavelength range so reflected to coincide with the axis of the light in the blue wavelength range that is emitted from the blue light source device 300 and that passes through the first dichroic mirror 141.

In addition, the second dichroic mirror 148 is disposed in a position where an axis of light in the red wavelength range emitted from the red light source device 120 intersects with an axis of light in the blue wavelength range emitted from the blue light source device 300. The second dichroic mirror 148 transmits light in the blue wavelength range and light in the green wavelength range and reflects light in the red wavelength range in such a way that the direction of the axis of the light in the red wavelength range is changed by 90 degrees so as to cause the axis of the light in the red wavelength range so reflected to coincide with the axis of the light in the blue wavelength range and the axis of the light in the green wavelength range that pass through the second dichroic mirror 148. Then, the light in the blue wavelength range and the light in the green wavelength range that pass through the second dichroic mirror 148 and the light in the red wavelength range that is reflected by the second dichroic mirror 148 are reflected in such a way that the directions of the axes of the blue, green and red lights are changed by 90 degrees to be incident on the light tunnel 175 by way of a collective lens 173.

The light source side optical system 170 includes the collective lens 173, the light tunnel 175 that is a light guiding member, a collective lens 178, a light axis changing mirror 181, a collective lens 183, a shining mirror 185, and a condenser lens 195. The condenser lens 195 collects light emitted from the display device 51 and causes the light so collected to be incident on the movable lens group 235 and a fixed lens group 225. Thus, the condenser lens 195 is also regarded as one of constituent elements of the projection side optical system 150.

The pencils of light that are emitted from the light source 60 are collected to the incident port of the light tunnel 175 by the collective lens 173. The intensities of the pencils of light incident on the light tunnel 175 are uniformly distributed across the width thereof. The pencils of light that emerge from an emerging port of the light tunnel 175 are collected by the collective lens 178. Thereafter, the directions of the axes of the pencils of light are changed to be directed towards the left side panel 14 by the light axis changing mirror 181.

The pencils of light that are reflected by the light axis changing mirror 181 are collected by the collective lens 183 and are then shone on to the display device 51 at a predetermined angle by way of the condenser lens 195 by the shining mirror 185. A heat sink 59 is provided on a side of the display device 51 that faces the back panel 12, whereby the display device 51 is cooled by this heat sink 59.

The light source light that is shone on to an image forming surface of the display device 51 by the light source side optical system 170 is reflected by the image forming surface of the display device 51 and is then projected on to the screen by way of the projection side optical system 150 as projected light. Here, the projection side optical system 150 includes the condenser lens 195, the movable lens group 235, the fixed lens group 225, and the projection lens 230. The movable lens group 235 can be moved by the lens motor. The movable lens group 235, the fixed lens group 225 and the projection lens 230 are incorporated in a fixed lens barrel. Consequently, the fixed lens barrel incorporating therein the movable lens group 235 is made as a variable-focus lens, enabling zooming and focusing controls.

Figure 4:
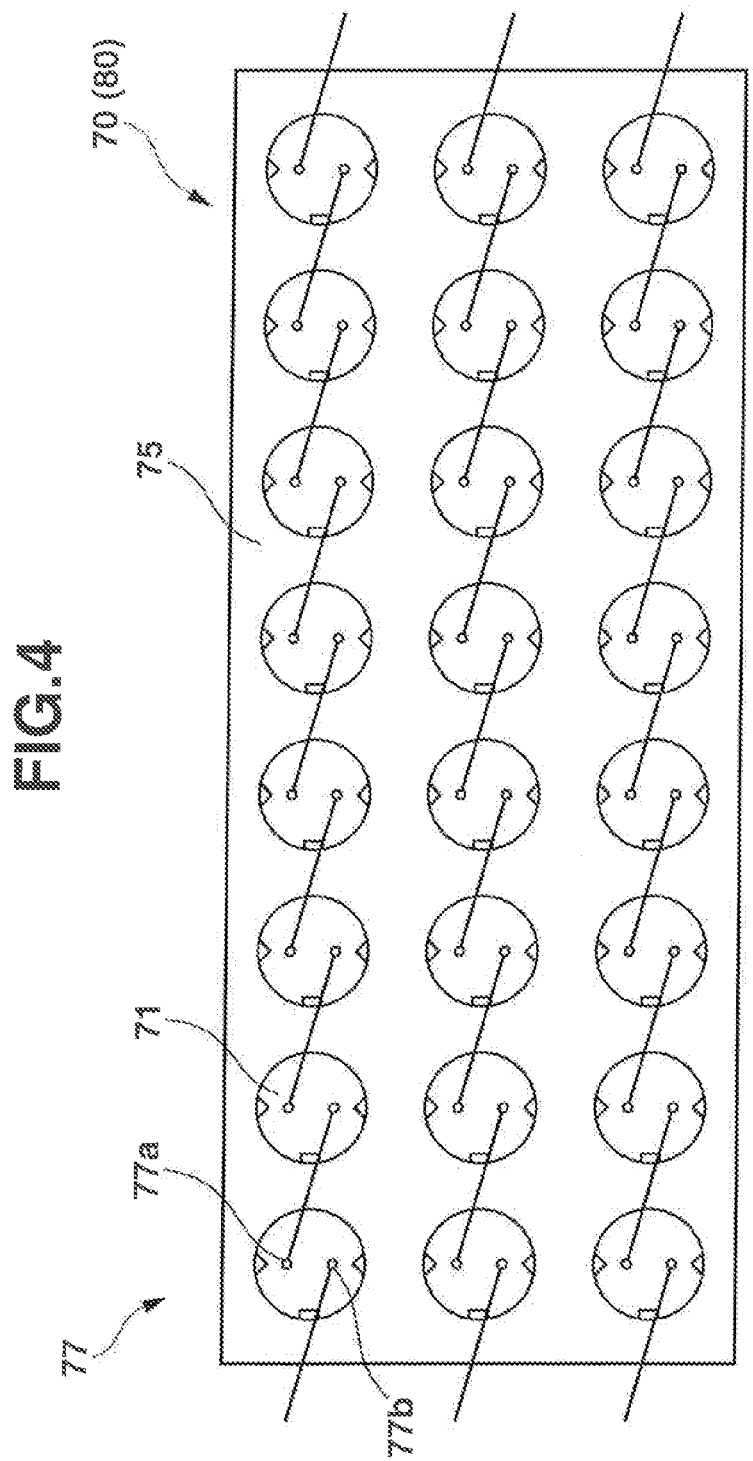
FIG. 4 is a schematic view showing the arrangement of laser diodes and how lead terminals are connected in an excitation light shining device of the projector according to the first embodiment of the invention.

Here, the excitation light shining device 70 will be described in greater detail by reference to FIG. 4. FIG. 4 is a schematic rear view of the holder 75 that holds the excitation light sources 71.

The excitation light sources 71 are blue laser diodes as semiconductor light emitting elements. Eight excitation light sources 71 are disposed in a single row in a horizontally lateral direction. Three excitation light sources 71 are disposed in a column in a vertical direction. Consequently, 24 blue laser diodes or excitation light sources 71 are disposed in total.

The excitation light sources 71 are disposed so as to be aligned in rows in the horizontally lateral direction and in columns in the vertical direction. Two lead terminals 77 (77a, 77b) are provided on each excitation light source 71. The two lead terminals 77a, 77b of each excitation light source 71 are provided so as to be aligned vertically, with the lead terminal 77a disposed upper and the lead terminal 77b disposed lower, so that the lead terminals 77 (77a, 77b) of at least adjacent excitation light sources 71 which are part of the excitation light sources 71 provided are connected in series.

For example, in FIG. 4, an upper lead terminal 77a of one excitation light source 71 is connected to a lower lead terminal 77b of another excitation light source 71 that lies adjacent to the one excitation light source 71 on a right-hand side thereof. In addition, in the eight excitation light sources 71 that are aligned in the row, the upper lead terminal 77a of the excitation light source 71 at one end of the row is connected to a power supply and the lower lead terminal 77b of the excitation light source 71 at the other end of the row is connected to the power supply.

Figure 5:
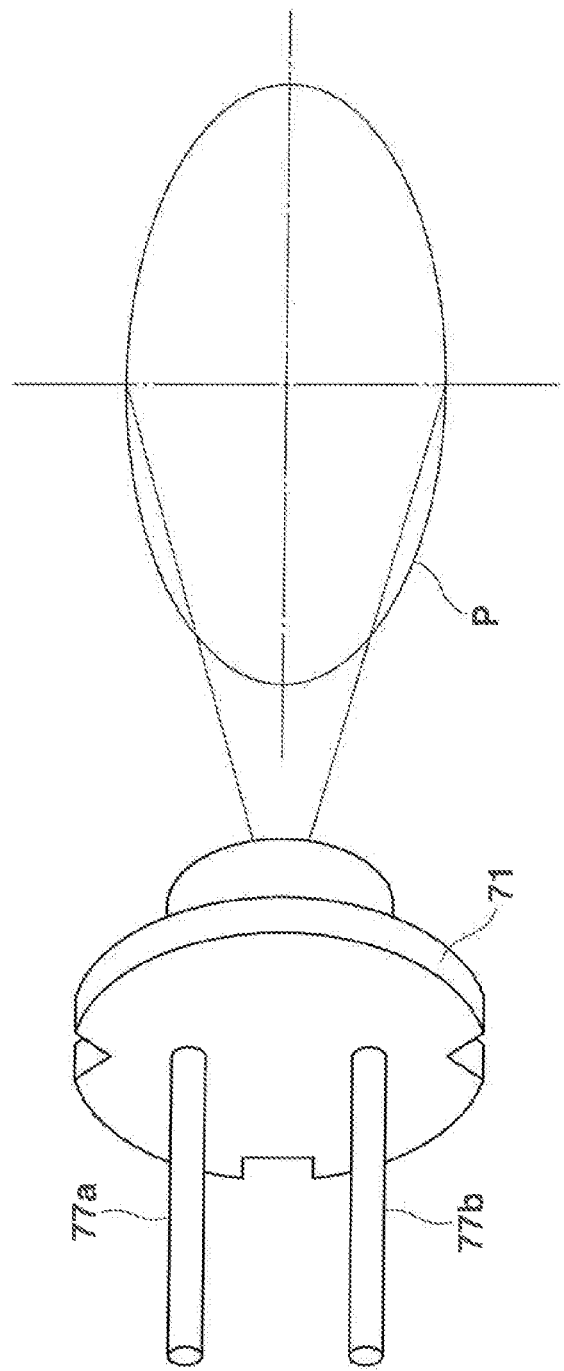
FIG. 5 is a schematic view showing a relationship between emitted light and lead terminals of the laser diode of the projector according to the first embodiment of the invention.

As shown in FIG. 5, in the blue laser diode that is the excitation light source 71, in general, the direction in which the lead terminals 77 (77a, 77b) are aligned intersects with the orientation of a major axis of an elliptic section of light emitted therefrom (in other words, a direction in which a diffusing angle of a laser beam from the blue laser diode becomes larger) at right angles. Namely, as shown in FIG. 5, when the lead terminals 77 (77a, 77b) are disposed vertically, light emitted from the excitation light source 71 is emitted in such a way that the major axis of the elliptic section is oriented or laid horizontal. In this embodiment, all the excitation light sources 71 are arranged completely in such away that their lead terminals 77 (77a, 77b) are oriented vertical. Thus, pencils of light emitted from the excitation light shining device 70 all come to have a horizontally elliptic section.

In this way, pencils of light that are emitted from the excitation light shining device 70 with their elliptic sections laid horizontal are, as shown in FIG. 3, shone on to the luminescent wheel 101 of the luminescent wheel device 100 by way of the collecting lenses 78, 79 and the first dichroic mirror 141. When the excitation light is shone on to the luminescent wheel 101 in that way, light in the green wavelength range is emitted from the green luminescent material layer laid on the luminescent wheel 101. Here, the excitation light is the pencil of light in which the major axis of the elliptic section is laid horizontal, the laser beams that constitute the excitation light are shone on to the luminescent wheel device 100 while being superposed one on another. Therefore, the light in the green wavelength range emitted from the luminescent material layer is also formed as a pencil of light in which a major axis of its elliptic section is laid horizontal.

Figure 6:
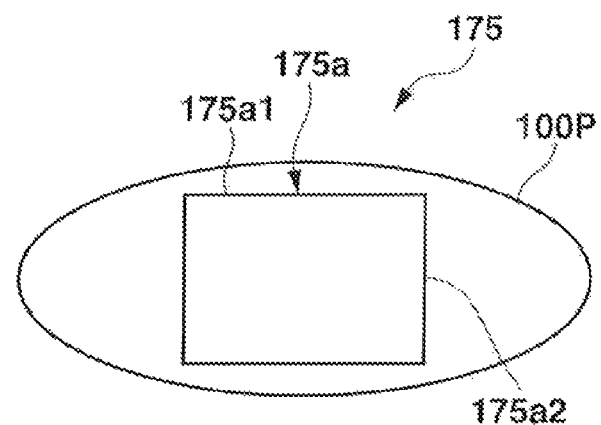
FIG. 6 is a schematic view showing a relationship between a pencil of light and an incident port of a light guiding member in the projector according to the first embodiment of the invention.

Light in the green wavelength range that is emitted from the luminescent wheel device 100 is incident on the incident port of the light tunnel 175 that is a light guiding member by way of the light guiding optical system 140 and the collective lens 173. Here, as shown in FIG. 6, in the light tunnel 175, the incident port 175a is formed into a horizontally elongated rectangular shape so as to match the shape of the horizontally elongated rectangular screen. That is, the incident port 175a is disposed in such a way that longer sides 175a1 are laid horizontal, while shorter sides 175a2 are laid vertical.

Then, a pencil of light in the green wavelength range having an elliptic section 100P in which its major axis is laid horizontal is shone on to the incident port 175a of the light tunnel 175. As this occurs, the pencil of light having the elliptic section 100P in which the major axis is laid horizontal is shone on to the horizontally elongated rectangular incident port 175a of the light tunnel 175. Thus, the pencil of light in the green wavelength range is shone on to the incident port 175a of the light tunnel 175 without any loss.

In the light in the green wavelength range that has passed through the light tunnel 175 in the way described above, the intensity thereof is uniformly distributed. Then, the light in the green wavelength range that has emerged from the emerging port of the light tunnel 175 is shone on to the display device 51 by way of the collective lens 178, the light axis changing mirror 181, and the like.

Figure 7:
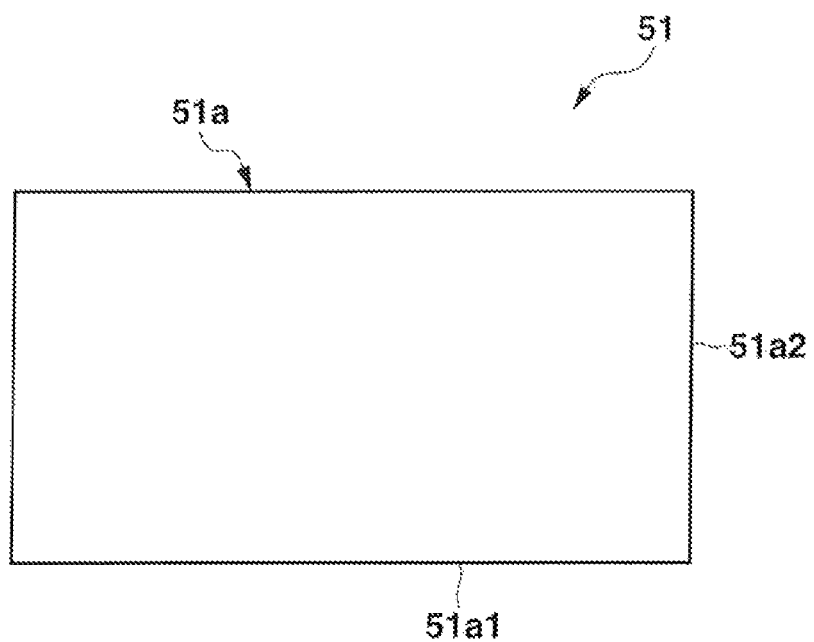
FIG. 7 is a schematic plan view showing an image forming surface of a display device of the projector according to the first embodiment of the invention.

Next, as shown in FIG. 7, an image forming surface 51a is provided on the display device 51. A large number of micromirrors are disposed on the image forming surface 51a so as to form a projected image. The image forming surface 51a has longer sides 51a1 and shorter sides 51a2. The image forming surface 51a is disposed in the projector 10 so that the longer sides 51a1 are laid horizontally.

The light in the green wavelength range emitted from the luminescent wheel device 100 is shone on to the image forming surface 51a of the display device 51 that is formed in the way described above. The light in the green wavelength range has the elliptic section in which the major axis is laid horizontally. Thus, the major axis of the elliptic section of the light emitted from the luminescent wheel device 100 to be shone on to the image forming surface 51a of the display device 51 is oriented horizontally in the same way as the longer sides 51a1 of the rectangular image forming surface 51a are oriented. Consequently, the pencil of light in the green wavelength range emitted from the luminescent wheel device 100 is shone on to the image forming surface 51a of the display device 51 without any loss.

Thus, while the first embodiment of the invention has been described heretofore, the invention is not limited to the first embodiment but can be carried out while being altered or modified as required. For example, in the embodiment, while the excitation light sources 71 are described as being made up of the blue laser diodes, a high-intensity light emitting diode (LED) may be used as another semiconductor light emitting element. Additionally, the invention is not limited to the case where the semiconductor light emitting element is used as the excitation light source. A light source device formed by a plurality of semiconductor light emitting elements can be adopted as a light source of a certain color that emits light in the wavelength range of a certain color.

The connection of the lead terminals 77 of the blue laser diodes that are the excitation light sources 71 is not limited to the connection described in the first embodiment of the invention. A connection should be adopted in which the upper lead terminal 77a and the lower lead terminal 77b of one excitation light source 71 is connected to the lower lead terminal 77b and the upper lead terminal 77a of another excitation light source 71 that lies horizontally or vertically adjacent to the one excitation light source 71.

In the embodiment described above, while the light tunnel 175 is described as being used as the light guiding member, the invention is not limited thereto. Thus, a glass rod may be used as a light guiding member.

Thus, according to the first embodiment of the invention, the projector 10 includes the plurality of excitation light sources 71 that are the semiconductor light emitting elements as the light sources and the display device 51. In the display device 51, the longer sides 51a1 of the image forming surface 51a are disposed so as to be parallel to the major axis of the elliptic section of the light emitted from the excitation light source 71.

By adopting this configuration, since the light source light is uniformly shone on without any loss to the image forming surface 51a of the display device 51 that is disposed as in the form of the horizontally elongated rectangle, the intensity of reflected light per unit area on the image forming surface 51a of the display device 51 is improved to thereby reduce color irregularity, thereby making it possible to obtain a bright projected image.

The projector 10 also includes the holder 75 on which the plurality of excitation light sources 71 that are the blue laser diodes as the semiconductor light emitting elements are disposed and the light tunnel 175 that is the light guiding member.

The plurality of excitation light sources 71 is disposed in the projector 10 so that the direction in which the diffusing angle of the beam of light respectively emitted from the blue laser diodes that are the semiconductor light emitting elements becomes larger (namely, the direction of the major axis of the elliptic section of the light respectively emitted from the semiconductor light emitting elements) becomes almost parallel to the direction of the longer sides 175a1 of the incident port 175a of the light guiding member such as the light tunnel 175. Therefore, light that leaks to the outside from the incident port 175a of the light tunnel 175 is reduced, and this enables much light to enter the interior of the incident port 175a of the light tunnel 175, thereby providing an advantage that a bright projected light is obtained.

In addition, plurality of excitation light sources 71 is disposed in the projector 10 so that the direction in which the diffusing angle of the beam of light respectively emitted from the semiconductor light emitting elements such as the blue laser diodes or the like becomes larger (Namely, the direction of the major axis of the elliptic section of the light respectively emitted from the semiconductor light emitting elements) becomes almost parallel to the direction of the longer sides 175a1 of the incident port 175a of the light guiding member such as the light tunnel 175. Therefore, in the light emitted from the semiconductor light emitting element, the external light whose diffusing angle is larger can be taken in more easily. With the external light having the large diffusing angle, the number of times of reflection within the light tunnel can be increased, enhancing the mixing effect. Therefore, the intensity of the light can get distributed more uniformly. Thus, the uniformity in illuminance distribution of a projected image can be improved.

The excitation light sources 71 are disposed on the holder 75 in such a way that one lead terminal 77a is placed upper and the other lead terminal 77b is placed lower. When the holder 75 is seen from the rear thereof, the excitation light sources 71 are disposed in such a way that an upper lead terminal 77a of one excitation light source 71 is connected to a lower lead terminal 77b of another excitation light source 71 that lies adjacent to the one excitation light source 71 on a right-hand side thereof.

This allows the excitation light sources 71 to be disposed on the holder 75 so that the major axis of the elliptic section of the light emitted from the excitation light source 71 is oriented or laid horizontally. Further, the lead terminals 77 of the excitation light sources 71 that are disposed in the way described above are disposed so that the lead terminals 77 of the same pole are aligned on the upper side or the lower side, whereby the wiring work can be performed in a more ensured fashion.

The excitation light sources 71 are disposed in rows in the horizontal direction and are disposed in columns in the vertical direction, and the excitation light sources 71 that are disposed in the horizontal direction are connected to each other. This can provide the projector that has the light source device that facilitates not only the hole making work of making holes for fitting the excitation light sources 71 in the holder 75, but also the wiring work of connecting the lead terminals 77.

The excitation light sources 71 are made up of the blue laser diodes that are the semiconductor light emitting elements. By using the blue laser diodes that consume less electric power while maintain the high intensity and that have a long life for the excitation light sources 71, the excitation light sources 71 can be excitation light sources for the luminescent material layer.

In forming the projector 10, the blue light emitting diode is used as the blue light source device 300, the red light emitting diode is used as the red light source device 120, and the luminescent wheel device 100 having the luminescent wheel 101 is used as the green light source device 80. The luminescent wheel 101 has the green luminescent material layer on to which light from the excitation light sources 71 is shone. In the projector 10 formed as described above, by using the blue laser diodes for the excitation light sources, the projector can be provided which can emit light in the red wavelength range, light in the green wavelength range and light in the blue wavelength range.

In the projector 10, the longer sides 51a1 of the image forming surface 51a of the display device 51 are laid to be oriented horizontally, and the longer sides 175a1 of the incident port 175a of the light tunnel 175 that is the light guiding member are laid horizontally. By adopting this configuration, the projector 10 can be provided which can project a bright projected image in which the color irregularity is reduced on to the horizontally elongated rectangular screen.

Second Embodiment

Hereinafter, a second embodiment of the invention will be described by reference to FIGS. 8 to 11.

Figure 8:
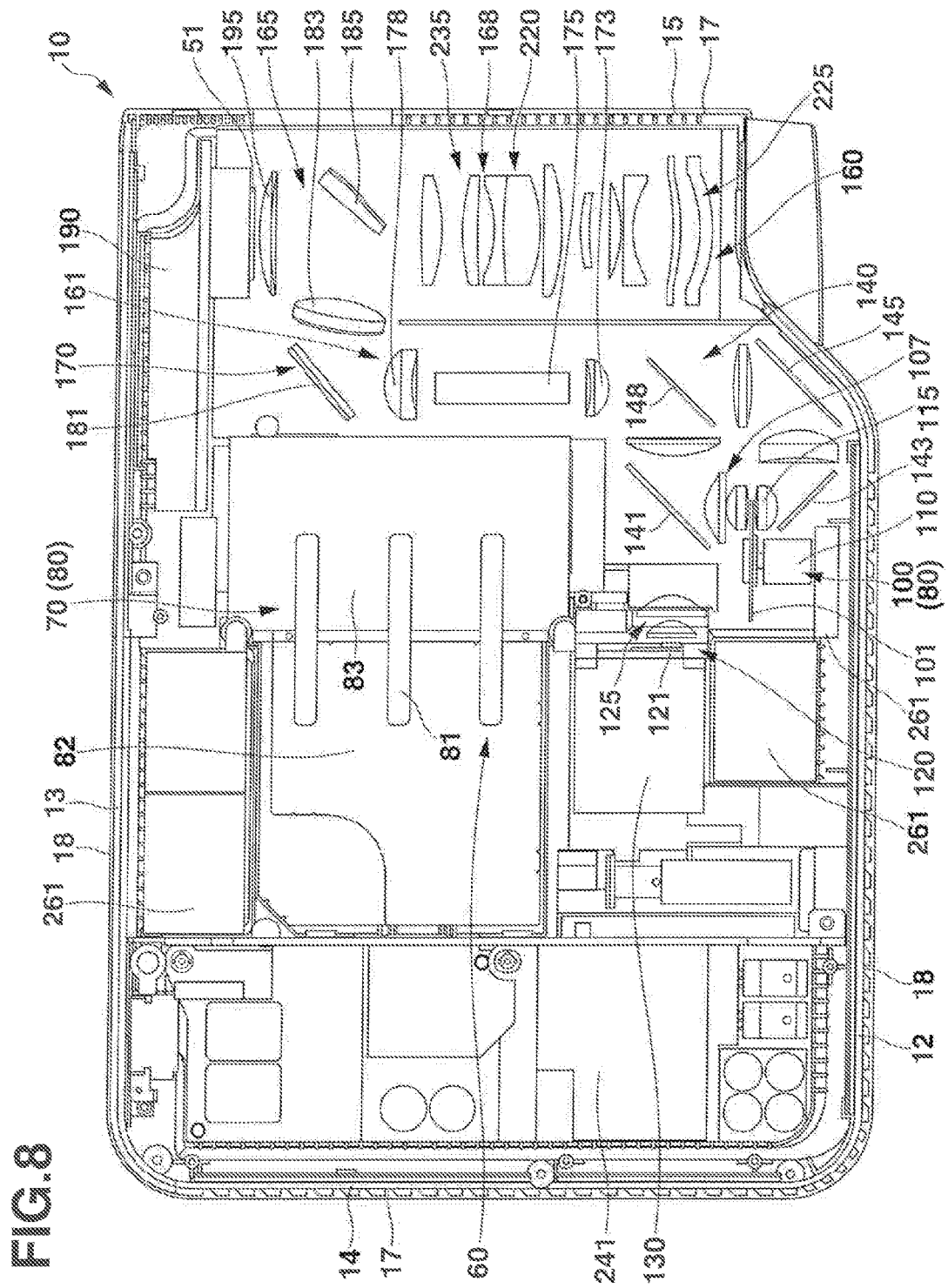
FIG. 8 is a schematic plan view showing an internal construction of a projector according to a second embodiment of the invention.
Figure 9:
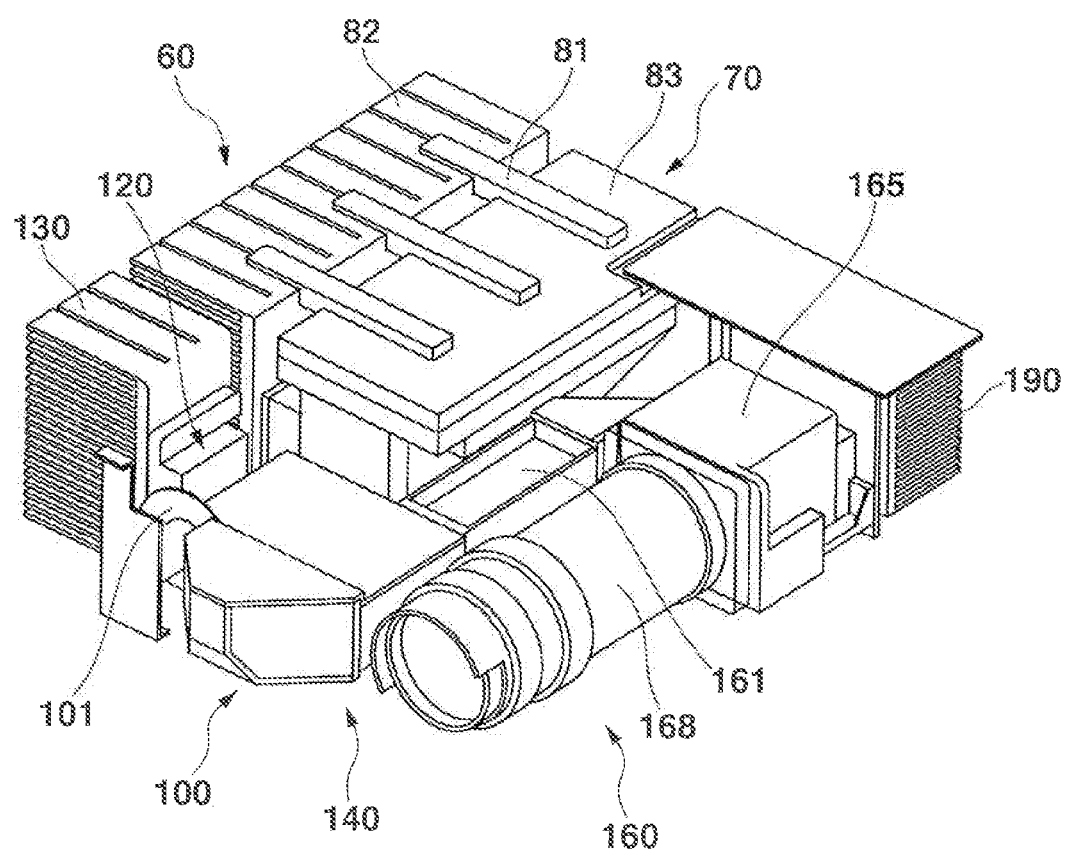
FIG. 9 is a perspective view showing part of the internal construction of the projector according to the second embodiment of the invention.

Firstly, an internal construction of a projector 10 according to the second embodiment will be described by reference to FIGS. 8 and 9. FIG. 8 is a schematic plan view showing the internal construction of the projector 10. FIG. 9 is a perspective view showing an arrangement of a light source unit 60 including a blue light source device 70 that doubles as an excitation light shining device for a green light source device, a luminescent wheel device 100 that functions as the green light source device and a red light source device 120, and an optical system unit 160 that is made up of an illumination side block 161, an image generation block 165, and a projection side block 168. The projector 10 includes a control circuit board 241 near a right side panel 15. This control circuit board 241 includes a power supply circuit block, a light source control block, and the like. The projector 10 includes the light source unit 60 that lies to a side of the control circuit board 241, that is, at a substantially central portion of a casing of the projector 10. Further, the projector 10 includes the optical system unit 160 that is made up of the image generation block 165, the projection side block 168 and the like between the light source unit 60 and a left side panel 14.

The light source unit 60 includes the blue light source device 70 that is disposed at a substantially lateral central portion of the casing of the projector 10 and near a back panel 13, the luminescent wheel device 100 that is disposed on an axis of light emitted from the blue light source device 70 and near a front panel 12, the red light source device 120 that is disposed between the blue light source device 70 and the luminescent wheel device 100, and a light guiding optical system 140 that changes the directions of axes of light emitted from the luminescent wheel device 100 and light emitted from the red light source device 120 so that they are oriented in the same direction so as to cause those colors of light to be collected to an incident port of a light tunnel 175 that is a predetermined plane.

Figure 10:
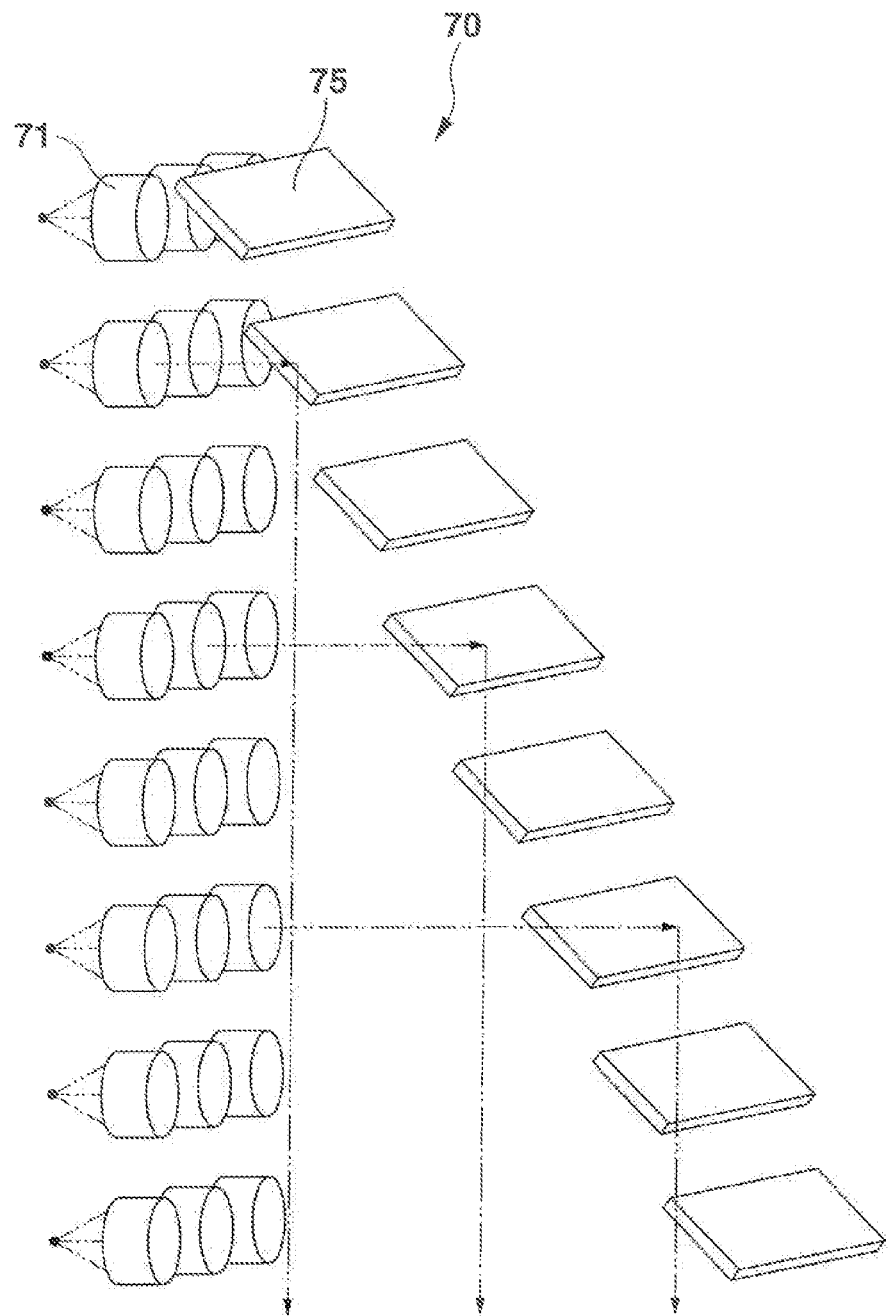
FIG. 10 is a schematic perspective view showing an arrangement of laser diodes and reflecting mirrors in the projector according to the second embodiment of the invention.

In the blue light source device 70 that doubles as the excitation light shining device, blue laser diodes 71 emit light from an upper surface towards a lower surface of the casing of the projector 10 as shown in FIG. 10. As shown in FIG. 10, In total, 24 blue laser diodes 71 are arranged into three rows and eight columns. Then, a plurality of reflecting mirrors 75 are disposed so as to face correspondingly the columns of blue laser diodes 71. The reflecting mirrors 75 are fixed to a plate member, not shown, that is configured as being made up of a series of steps. In FIGS. 8 and 9, the blue laser diodes 71 are fixed to a rear surface side of a holder 83.

Thus, in FIGS. 8 and 9, the plurality of laser diodes 71 shown in FIG. 10 are fixed to the holder 83, and the reflecting mirrors 75 are fixed to the plate member formed of aluminum or the like and configured as being made up of the series of steps that is disposed opposite to the holder 83. As this occurs, the plate member having the steps-like configuration to which the reflecting mirrors 75 are fixed is disposed below the laser diodes 71 in such a way as to be superposed on the holder 83. Then, the plate member having the steps-like configuration is inclined so as to approach a lower surface side of the casing of the projector 10 as it extends towards the luminescent wheel device 100. Consequently, the distances between the blue laser diodes 71 and the reflecting mirrors 75 get gradually longer as the plate member extends towards the luminescent wheel device 100. The reflecting mirrors 75 each have a laterally elongated rectangular shape. Thus, in total, eight such reflecting mirrors 75 are disposed in a front-to-rear direction, and the directions of axes of beams of light emitted from the individual blue laser diodes 71 are changed by 90 degrees in the direction of the front panel 12 by these eight reflecting mirrors 75.

As shown in FIGS. 8 and 9, an upper surface of the holder 83 is connected to heat pipes 81. Then, the heat pipes 81 are connected to a cooling fin 82. A cooling fan 261 is disposed between the cooling fin 82 and the back panel 13. Thus, a working fluid in the heat pipes 81 is cooled by the cooling fan 261 and the cooling fin 82. The heat pipes 81 are each formed by using a pipe from which inner air is evacuated. Then, in each pipe, a fluid circulation wick thereof is formed so as to have a capillary construction, a vapor passage pipe is provided in the center thereof, and pure water, perfluorocarbon or the like is used as working fluid.

The luminescent wheel device 100 of the green light source device 80 includes a luminescent wheel 101, a wheel motor 110 that drives to rotate the luminescent wheel 101, a group of collective lenses 107, and a collective lens 115. The luminescent wheel 101 is disposed so as to be parallel to the front panel 12, that is, so as to be at right angles to an axis of light emitted from the blue light source device 70. The group of collective lenses 107 collects pencils of light that are emitted from the blue light source device 70 on to the luminescent wheel 101 and also collects pencils of light that are emitted from the luminescent wheel 101 in the direction of the back panel 13. The collective lens 115 collects pencils of light that are emitted from the luminescent wheel 101 in the direction of the front panel 12.

A green luminescent light emitting area and a diffuse transmission area are provided circumferentially in an end-to-end fashion on the luminescent wheel 101. The green luminescent light emitting area receives light emitted from the blue light source device 70 as excitation light to emit luminescent light in the green wavelength range. The diffuse transmission area transmits light emitted from the blue light source device 70 while diffusing it. A surface of the luminescent wheel 101 that faces the back panel 13 in the green luminescent light emitting area is mirror finished through silver deposition, and a strip of green luminescent material layer is laid out on the mirror finished surface. Further, microscopic irregularities are formed on a surface of the luminescent wheel 101 in the diffuse transmission area through sandblasting.

Then, light emitted from the blue light source device 70 to be shone on to the green luminescent material layer of the luminescent wheel 101 excites a green luminescent material that is a luminescent material in the green luminescent material layer, and luminescent light that is emitted in every direction from the green luminescent material is emitted directly towards the back panel 13. Alternatively, part of the luminescent light so emitted is reflected on the surface of the luminescent wheel 101 and is then emitted towards the back panel 13 to be incident on the group of collective lenses. Additionally, light emitted from the blue light source device 70 to be shone on to the diffuse transmission area of the luminescent wheel 101 is diffused by the microscopic irregularities to be incident on the collective lens 115 as diffused and transmitted light. A cooling fan 261 is disposed between the wheel motor 110 and the front panel 12, and this cooling fan 261 cools the luminescent wheel 101.

The red light source device 120 is a monochromatic light emitting device and includes a red light source 121 that is disposed so that an optical axis thereof is parallel to the front panel 12 and a group of collective lenses 125 that collects light emitted from the red light source 121. The red light source 121 is a red light emitting diode that emits light in the red wavelength range. The red light source device 120 is disposed so that an optical axis thereof intersects with light emitted from the blue light source device 70 and light in the green wavelength range emitted from the luminescent wheel 101. Further, the red light source device 120 includes a heat sink 130 that is disposed on a side of the red light source 121 that faces the right side panel 15. A cooling fan 261 is disposed between the heat sink 130 and the front panel 12, and this cooling fan 261 cools the red light source 121.

The light guiding optical system 140 includes collective lenses that collect pencils of light in the red, green and blue wavelength ranges, and reflecting mirrors and dichroic mirrors that change the directions of axes of the pencils of light in the wavelength ranges of those colors so as to be oriented in the same direction, and the like. Specifically, a first dichroic mirror 141 is disposed in a position where light in the blue wavelength range emitted from the blue light source device 70 and light in the green wavelength range emitted from the luminescent wheel 101 intersect with light in the red wavelength range emitted from the red light source device 120. This first dichroic mirror 141 transmits light in the blue wavelength range and light in the red wavelength range and reflects light in the green wavelength range in such away that the direction of an axis of the green light is changed by 90 degrees in the direction of the left side panel 14.

A first reflecting mirror 143 is disposed on an axis of light in the blue wavelength range that passes through the luminescent wheel 101, that is, between the collective lens 115 and the front panel 12. This first reflecting mirror 143 reflects the light in the blue wavelength range in such a way that an axis of the blue light is changed by 90 degrees in the direction of the left side panel 14. Further, a second reflecting mirror 145 is disposed on the axis of the light in the blue wavelength range that is reflected by the first reflecting mirror 143 and near the optical system unit 160. This second reflecting mirror 145 changes the direction of an axis of the blue light by 90 degrees in the direction of the back panel 13.

A second dichroic mirror 148 is disposed in a position where the axis of the light in the red wavelength range that passes through the first dichroic mirror 141 and the axis of the light in the green wavelength range that is reflected by the first dichroic mirror 141 so as to coincide with the axis of the light in the red wavelength range intersect with the axis of the light in the blue wavelength range that is reflected by the second reflecting mirror 145. This second dichroic mirror 148 transmits the light in the blue wavelength range and reflects the light in the red wavelength range and the light in the green wavelength range so that the directions of the axes of the red light and the green light are changed by 90 degrees in the direction of the back panel 13. Collective lenses are disposed between the dichroic mirrors and the reflecting mirrors. Further, a collective lens 173 is disposed near the light tunnel 175, and this collective lens 173 collects the light source light to the incident port of the light tunnel 175.

The optical system unit 160 is formed substantially into a U-shape by tree blocks, that is, the illumination side block 161 that is positioned to the left of the blue light source device 70, the image generation block 165 that is positioned near a position where the back plate 13 and the left side panel 14 intersect, and the projection side block 168 that is positioned between the light guiding system 140 and the left side panel 14.

The illumination side block 161 includes apart of alight source side optical system 170 that guides light source light emitted from the light source unit 60 to the display device 51 that the image generation block 165 includes. The light source side optical system 170 that the illumination side block 161 possesses incorporates the light tunnel 175 that transforms pencils of light emitted from the light source unit 60 into pencils of light in which the intensity is uniformly distributed, a collective lens 178 that collects the light emitted from the light tunnel 175, a light axis changing mirror 181 that changes the directions of axes of the pencils of light that are emitted from the light tunnel 175 in the direction of the image generation block 165, and the like.

Figure 12A:
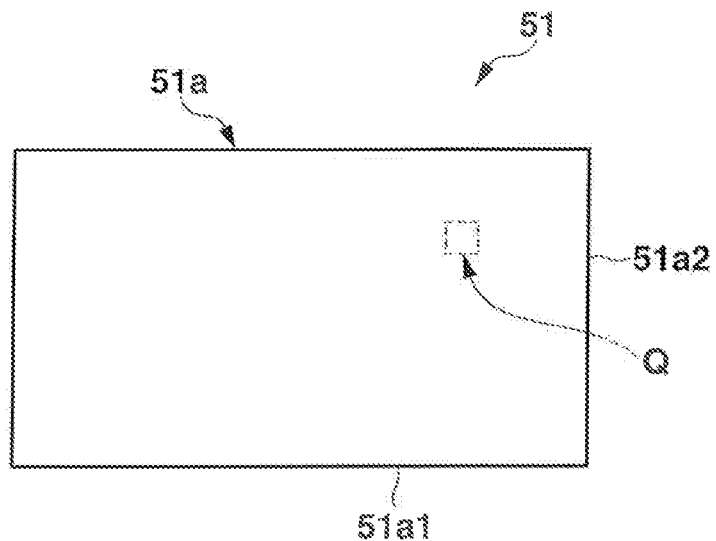
FIG. 12A and FIG. 12B show a display device of the projector according to the second embodiment of the invention.

The image generation block 165 incorporates, as the light source side optical system 170, a collective lens 183 that collects the light source light that is reflected by the light axis changing mirror 181 to the display device 51, and a shining mirror 185 that shins the pencils of light that pass through the collective lens 183 towards the display device 51. Further, the image generation block 165 incorporates a DMD that functions as the display device 51. A heat sink 190 adapted to cool the display device 51 is disposed between the display device 51 and the back panel 13, and the display device 51 is cooled by this heat sink 190. A condenser lens 195 as a projection side optical system 220 is disposed near the front of the display device 51. The display device 51 has an image forming surface 51a that is formed into a rectangle as shown in FIG. 12A, and this image forming surface 51a is disposed in such away that longer sides 51a1 are laid horizontally in a left-to-right direction.

As shown in FIGS. 8 and 9, the projection side block 168 incorporates a lens group making up the projection side optical system 220 that projects "on" light that is reflected by micromirrors in "on" positions in the display device 51 on to a screen. This projection side optical system 220 is made up of a variable-focus lens with a zooming function that includes a fixed lens group 225 and a movable lens groove 235 that are incorporated in a fixed lens barrel, and the movable lens group 235 can be moved by a lens motor for zooming control and focusing control.

Next, an arrangement of the blue laser diodes 71 and the reflecting mirrors 75 in the blue light source device 70 that doubles as the excitation light shining device is explained by reference to FIG. 10. In FIG. 10, a left-hand side of a sheet of paper on which FIG. 10 is drawn denotes an upper surface side of the projector 10.

The blue laser diodes 71 are fixed to the holder 83 (refer to FIG. 9) so as to be arranged into a matrix of three rows and eight columns (in total, 24 blue laser diodes). Although not shown, collimator lenses are disposed individually on optical axes of the blue laser diodes 71, and these collimator lenses are collective lenses that convert light emitted from the blue laser diodes 71 into parallel light. The reflecting mirrors 75 are provided so as to face individually the columns of blue laser diodes 71.

The reflecting mirror 75 that is formed into a short strip-like rectangular shape is disposed so as to be oriented in the left-to-right direction of the projector 10 in such a way that longer sides of the reflecting mirror 75 match the length of the row of blue laser diodes. Thus, the reflecting mirror 75 is disposed so as to face the column of three blue laser diodes 71. Then, in total, eight such reflecting mirrors 75 are disposed in the steps-like configuration so as to be deployed along a direction in which light is emitted from the blue light source device 70 (in a downward direction on the sheet of paper where FIG. 10 is drawn, that is, towards the front panel 12). Although not shown, these reflecting mirrors 75 are fixed to the plate member that is configured as being made up of the series of steps. Light emitted from the blue laser diodes 71 is emitted integrally without any gaps to a collective lens, not shown, that is provided in the emitting direction of the blue light source device 70 while narrowing a sectional area of a pencil of light in each column to one direction.

Here, the plurality of blue laser diodes 71 are disposed parallel to one another. In general, when arriving at a position that it illuminates, light emitted from the blue laser diode 71 forms an ellipse P shown in FIG. 11, which is regarded here as an elliptic section of the light. Thus, the blue laser diode 71 is disposed so that a major axis of the ellipse P of the light emitted therefrom becomes substantially parallel to the longer sides of the reflecting mirror 75 having the rectangular shape and that the emitted light, that is, the ellipse P falls within the reflecting mirror 75. Then, pencils of light emitted from the blue laser diodes 71 of each column are fall within a reflecting surface of the reflecting mirror 75 so as to be reflected thereon without any loss. All the blue laser diodes 71 and the reflecting mirrors 75 are disposed in this way, and therefore, pencils of light emitted from the blue light source device 70 are emitted with the major axes of the ellipses of the pencils of light aligned in the left-to-right direction of the projector 10 (in other words, in a horizontal direction relative to the projector 10) that is an orientation that becomes parallel to a plane of the sheet on which FIG. 8 is drawn.

Figure 11:
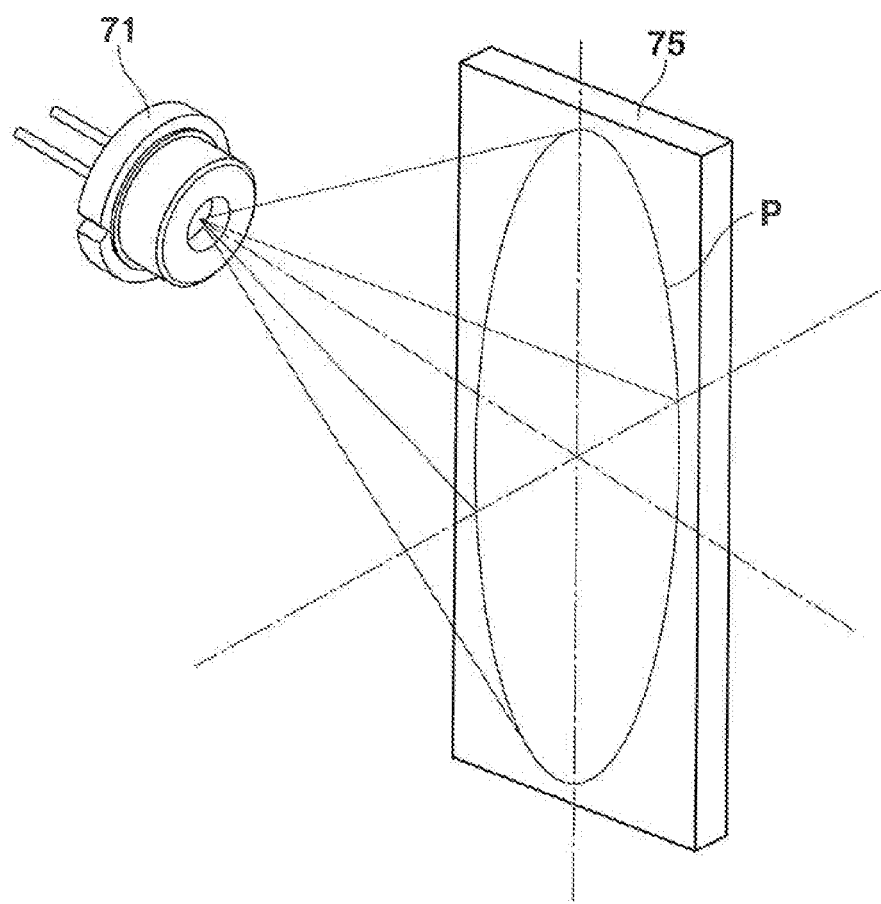
FIG. 11 is a schematic view showing emitted light of the laser diode of the projector according to the second embodiment of the invention.

FIG. 11 shows a state in which the major axis of light emitted from the blue laser diode 71 is aligned with the longer sides of the reflecting mirror 75. Thus, the direction in which the major axes of pencils of light that are emitted from each row of three blue laser diodes 71 shown in FIG. 10 are laid or oriented also coincides with the direction in which the column extends, that is, the direction of the longer sides of the reflecting mirror 75. Thus, three blue laser beams are shone on to the reflecting mirror 75 in such away as to fall properly thereon.

The pencils of light emitted from the blue light source device 70 with the orientations of the ellipses aligned in the horizontally lateral direction relative to the projector 10 are collected by the condenser lens 95 by way of the light guiding optical system 140 and the light source optical system 170 while their rotational positions relative to the optical axes of the blue laser diodes 71 are maintained (in other words, while the orientations of the elliptic sections of the pencils of light are maintained) and are then shone on to the image forming surface 51a of the display device 51. On the other hand, as has been described above, the image forming surface 51a of the digital micromirror device (DMD) that is the display device 51 as shown in FIG. 12A is disposed in such a way that the longer sides 51a1 of the rectangular image forming surface 51a that is formed by the longer sides 51a1 and the shorter sides 51a2 are laid horizontally laterally in the left-to-right direction of the projector 10 as shown in FIG. 1.

Figure 12B:
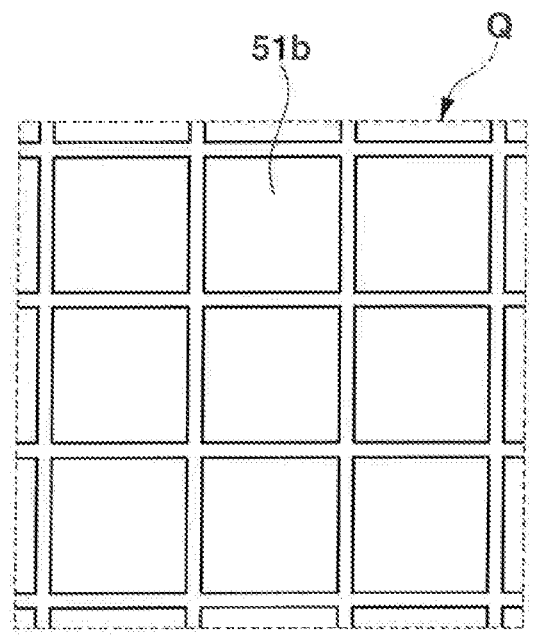

Consequently, the light emitted from the blue light source device 70 is shone on to the image forming surface 51a of the display device 51 with the orientation of the major axis of the section of the ellipse P of the light emitted from the blue light source device 70 maintained substantially parallel to the longer sides 51a1 of the rectangular image forming surface 51a of the display device 51. In other words, the light emitted from the light source is shone on to the image forming surface 51a of the display device 51 with the orientation of the major axis of the section of the ellipse P of the light emitted from the blue laser diode 71 that is the light source as shown in FIG. 11 made to coincide with the orientation of the longer sides of the rectangular image forming surface 51a of the display device 51 as shown in FIG. 12A. FIG. 12B is an enlarged plan view of a portion Q of the digital micromirror device (DMD) or the display device 51 shown in FIG. 12A where a large number of micromirrors 51b are disposed.

The light emitted from the blue light source device 70 is also made to function as excitation light to be shone on to the green luminescent material layer on the luminescent wheel 101 that generates light in the green wavelength range. In this embodiment, pencils of light emitted from the blue light source device 70 are incident on the luminescent wheel 101 while the orientations of the major axes of the elliptic sections of the pencils of light emitted from the laser diodes 71 are aligned in the horizontally lateral direction relative to the projector 10. Consequently, with pencils of light in the green wavelength range that are emitted from the luminescent wheel 101, too, the orientations of major axes of elliptic sections of the pencils of light so emitted are aligned in the horizontally lateral direction relative to the projector 10. Then, the pencils of light emitted from the luminescent wheel 101 are also shone on to the image forming surface 51a of the display device 51 by way of the light guiding optical system 140 and the light source side optical system 170 while the orientations of the major axes of the elliptic sections of the pencils of light are maintained or while their rotational positions relative to the optical axes of the blue laser diodes 71 are maintained. Then, the pencils of light emitted from the luminescent wheel 101 are shone on to the image forming surface 51a of the display device 51 with the major axes of the elliptic sections of the pencils of light in the green wavelength range emitted the luminescent wheel 101 made to be substantially parallel to the longer sides 51a1 of the rectangular image forming surface 51a of the display device 51. In other words, the pencils of light emitted from the light source are shone on to the image forming surface 51a of the display device 51 with the orientations of the major axes of the elliptic sections of the pencils of light from the light source made to coincide with the orientations of the longer sides of the rectangular image forming surface of the display device 51.

In this embodiment, while the blue laser diodes 71 are disposed so as to emit light from the upper surface towards the lower surface of the projector 10, the blue laser diodes 71 may be disposed so as to emit light from the lower surface towards the upper surface of the projector 10. Additionally, in the event that the display device 51 is disposed in such a way that the shorter sides of the rectangular display device 51 are oriented horizontally laterally in the left-to-right direction, to match this configuration, the blue laser diodes 71 may be disposed so as to emit light in a direction from the left to the right or a direction from the right to the left relative to the projector 10. Namely, the invention can be carried out in the event that the blue laser diodes are disposed so that the major axes of the elliptic sections of the pencils of light emitted from the individual blue laser diodes 71 become substantially parallel to the longer sides 51a1 of the image forming surface 51a of the rectangular display device 51 (in other words, so that the orientations of the major axes of the elliptic sections coincide with the orientations of the longer sides of the rectangular major image forming surface).

In the embodiment, while the cooling device of the blue light source device 70 is made up of the heat pipe 81 and the cooling fan 82, the blue light source device 70 may be cooled by a heat sink.

Thus, as has been described heretofore, the projector 10 according to the second embodiment has the blue light source device 70 in which the plurality of blue laser diodes 71 are provided which emit the light of the elliptic section and the display device 51 that is made up of the DMD. The pencils of light emitted from the blue laser diodes 71 are incident on the image forming surface 51a of the rectangular display device 51 in such a way that the major axes of the elliptic sections of the pencils of light emitted become substantially parallel to the longer sides 51a1 of the image forming surface 51a.

This allows the emitted pencils of light each forming the laterally elongated elliptic section to be shone on to the laterally elongated rectangular display device with the major axes of the elliptic sections oriented in the same direction as the longer sides of the image forming surface. Therefore, compared with the conventional case where the light having the vertically elongated elliptic section is shone, the light source light is shone uniformly without any loss. Consequently, not only can the color irregularity in a projected image be eliminated, but also the intensity of reflected light per unit area on the image forming surface of the display device can be improved, thereby making it possible to obtain a bright projected image.

The blue laser diodes 71 are disposed so as to be parallel to one another. This can realize in an ensured fashion the reduction in color irregularity and the improvement in luminance of a projected image.

In the pencils of light that are shone on to the image forming surface 51a of the display device 51, the pencils of light in the green wavelength range are included which are emitted from the luminescent light emitting member that uses the light emitted from the blue laser diodes 71 as excitation light. This enables the invention to also be applied preferably to a case where the laser diodes are used not only as the light sources but also as the excitation light sources that emit excitation light that excites the luminescent light emitting material by paying attention to the high intensity of light emitted from the laser diode.

The rectangular reflecting mirrors 75 are disposed on the optical path from the blue light source device 70 that is the light source to the display device 51. The orientations of the blue laser diodes 71 are aligned so that the major axes of the elliptic sections of the pencils of light emitted from the blue laser diodes 71 become substantially parallel to the longer sides of the reflecting mirrors. This enables the pencils of light of the elliptic section emitted from the blue laser diodes to be shone on to the rectangular reflecting mirrors without any loss to be reflected thereon. Consequently, the loss of the pencils of light can be reduced also on the optical path of the pencils of light emitted from the blue light source device towards the display device, and therefore, the projector can be provided which improves the utilization efficiency of the light source energy.

The reflecting mirrors 75 are fixed to the plate member that is configured as being made up of the series of steps, the plurality of blue laser diodes 71 are fixed to the holder 83, and the plate member having the steps-like configuration and the holder 83 are disposed so as to be superposed one on the other when viewed from the top. By adopting this configuration, the constituent devices in the interior of the casing of the projector can be laid out neatly, thereby making it possible to improve the assembling efficiency in fabrication of the projector.

The blue laser diodes 71 emit light from the upper surface towards the lower surface of the projector, and the reflecting mirrors 75 are disposed on the lower surface of the projector so as to individually face the blue laser diodes 71 in such a way as to reflect the light emitted from the blue laser diodes 71. This configuration allows the rear surfaces of the laser diodes that need to be cooled to be oriented towards the upper surface side, and therefore, the arrangement can be obtained which is advantageous in dissipating heat in relation to the layout in the interior of the projector. Additionally, the cooling devices adapted to cool the laser diodes can be disposed on the rear surface sides of the laser diodes, thereby making it possible to improve the assembling efficiency in fabrication of the projector.

The blue laser diodes 71 are cooled by the heat pipes. By adopting this configuration, the light source device is disposed according to the layout in the interior of the projector, and the vertical thickness of the light source device does not have to be increased, whereby the laser diodes can be cooled in an ensured fashion.

Further, while the digital micromirror device (DMD) is described as being used as the display device, the invention is not limited thereto, and hence, other display devices including a liquid crystal display device may be used.

The embodiments that have been described heretofore are presented as the examples of the invention, and hence, there is no intention to limit the scope of the invention by the embodiments described. These novel embodiments can be carried out in other various forms, and various omissions, replacements and alterations can be made without departing from the spirit and scope of the invention. These embodiments and their modifications are included in the spirit and scope of the invention and the scope of inventions described in claims and their equivalents.

What is claimed is:

1. A projector comprising:
   a light source device consisting of a plurality of laser diodes,
      wherein each of pencils of light emitted by the light source device has a radiation angle differing along a major axis and a minor axis orthogonal to the major axis to define an elliptic section of the each of the pencils of light, and
      wherein the major axis of the elliptic section of the each of the pencils of light is substantially parallel to one another;
   a light guide configured to guide the pencils of light emitted by the light source device, wherein the light guide comprises:
      a rectangular incident port on which the pencils of light emitted by the light source device are incident,
         wherein the rectangular incident port is disposed so that the major axis of the elliptic section of the each of the pencils of light is substantially parallel to the longer sides of the rectangular incident port; and
      a rectangular emerging port from which the pencils of light that enters from the rectangular incident port are caused to be emitted; and
   a display device comprising a rectangular image forming surface on to which the pencils of light emitted from the rectangular emerging port of the light guide are incident,
      wherein the rectangular image forming surface of the display device is disposed so that the major axis of the elliptic section of the each of the pencils of light emitted from the rectangular emerging port of the light guide is substantially parallel to the longer sides of the rectangular image forming surface of the display device.

2. The projector according to claim 1,
   wherein each of the plurality of laser diodes is configured to emit a pencil of light,
   wherein each of the pencils of light emitted by the each of the plurality of laser diodes has a radiation angle differing along a major axis and a minor axis orthogonal to the major axis to define an elliptic section of the each of the pencils of light emitted by the each of the plurality of laser diodes, wherein the each of the pencils of light emitted by the light source device corresponds to one of the pencils of light emitted by one of the plurality of laser diodes by way of one or more optical components of the light source device, and wherein the plurality of laser diodes are disposed in a direction substantially parallel to the major axis of the elliptic section of the each of the pencils of light emitted by the plurality of laser diodes.

3. The projector according to claim 1, wherein each of the plurality of laser diodes is configured to emit a pencil of light, wherein each of the pencils of light emitted by the each of the plurality of laser diodes has a radiation angle differing along a major axis and a minor axis orthogonal to the major axis to define an elliptic section of the each of the pencils of light emitted by the each of the plurality of laser diodes, and wherein the light source further comprises a luminescent light emitting member configured to:
be excited by the pencils of light emitted by the plurality of laser diodes; and
emit pencils of luminescent light, corresponding to the pencils of light emitted by the plurality of laser diodes, as the pencils of light that are incident on the rectangular incident port of the light guide.

4. The projector according to claim 1, wherein each of the plurality of laser diodes comprises two lead terminals, wherein the each of the plurality of laser diodes is configured to emit a pencil of light, wherein each of the pencils of light emitted by the each of the plurality of laser diodes has a radiation angle differing along a major axis and a minor axis orthogonal to the major axis to define an elliptic section of the each of the pencils of light emitted by the each of the plurality of laser diodes, wherein the major axis of the elliptic section of the pencil of light emitted by the each of the plurality of laser diodes are substantially parallel to one another, wherein the two lead terminals of the each of the plurality of laser diodes are arranged on an axis substantially parallel to the minor axis of the elliptic section of the each of the pencils of light emitted by the each of the plurality of laser diodes, and wherein the plurality of laser diodes are electrically connected in series by the two lead terminals of the each of the plurality of laser diodes.

5. The projector according to claim 1, wherein each of the plurality of laser diodes are disposed in one of a plurality of columns and in one of a plurality of rows, and wherein laser diodes of the plurality of laser diodes that are disposed in one row of the plurality of rows are electrically connected to one another.

6. The projector according to claim 1, wherein the plurality of laser diodes are blue laser diodes.

7. The projector according to claim 6, further comprising:

a blue light source device comprising a blue light emitting diode configured to emit light in the blue wavelength range;

a red light source device comprising a red light emitting diode configured to emit light in the red wavelength range; and the light source device as a green light source device, wherein the light source device further comprises a green luminescent material configured to:
be excited by light emitted by the plurality of laser diodes; and
emit the pencils of light that are incident on the rectangular incident port of the light guide in the green wavelength range.

8. The projector according to claim 1, wherein the light guide comprises a light tunnel or a glass rod.

9. The projector according to claim 1, further comprising:

reflecting mirrors each having a rectangular shape and adapted to reflect light emitted from each of the plurality of laser diodes are disposed on an optical path from the light source device to the display device, and the orientations of the plurality of laser diodes are aligned so that the major axis of the elliptic section of the each of the pencils of light is substantially parallel to the longer sides of each of the reflecting mirrors.

10. The projector according to claim 2, further comprising:

reflecting mirrors each having a rectangular shape and adapted to reflect light emitted from each of the plurality of laser diodes are disposed on an optical path from the light source device to the display device, and the orientations of the plurality of laser diodes are aligned so that the major axis of the elliptic section of the each of the pencils of light is substantially parallel to the longer sides of each of the reflecting mirrors.

11. The projector according to claim 9, further comprising:

a member to which the reflecting mirrors are fixed; and
a holder to which the plurality of laser diodes are fixed,
wherein the member and the holder are disposed so that the member and the holder are superposed one on the other when seen from an upper surface of a casing of the projector.

12. The projector according to claim 9, wherein the plurality of laser diodes emit light from the upper surface towards a lower surface of a casing of the projector, and the reflecting mirrors are disposed on the lower surface so as to face the plurality of laser diodes in such a way as to reflect light emitted from the plurality of laser diodes.

13. The projector according to claim 11, wherein the plurality of laser diodes emit light from the upper surface towards a lower surface of the casing, and the reflecting mirrors are disposed on the lower surface so as to face the plurality of laser diodes in such a way as to reflect light emitted from the plurality of laser diodes.

14. The projector according to claim 1, wherein the plurality of laser diodes are cooled by a heat pipe.

15. The projector according to claim 9, wherein the plurality of laser diodes are cooled by a heat pipe.

* * * * *